(12) United States Patent
Lindner et al.

(10) Patent No.: US 6,875,725 B2
(45) Date of Patent: Apr. 5, 2005

(54) EXHAUST-GAS PURIFICATION CATALYST TO BE USED CLOSE TO THE ENGINE AND PROCESS FOR ITS PRODUCTION

(75) Inventors: Dieter Lindner, Hanau (DE); Lothar Mussmann, Offenbach (DE); Martin Votsmeier, Maintal (DE); Egbert Lox, Hanau (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 413 days.

(21) Appl. No.: 09/928,470

(22) Filed: Aug. 14, 2001

(65) Prior Publication Data

US 2002/0039549 A1 Apr. 4, 2002

(30) Foreign Application Priority Data

Aug. 16, 2000 (EP) ............................................. 00117618

(51) Int. Cl.⁷ ............................. B01J 8/02; B01J 23/44; B01J 23/54; B01J 23/56; B01J 23/58
(52) U.S. Cl. .................... 502/328; 423/213.5; 502/325; 502/326; 502/327
(58) Field of Search ...................... 423/213.5; 502/325, 502/326–328

(56) References Cited

U.S. PATENT DOCUMENTS

| | | |
|---|---|---|
| 3,791,143 A | 2/1974 | Keith et al. |
| 3,896,616 A | 7/1975 | Keith et al. |
| 4,407,785 A | 10/1983 | Pfefferle |
| 4,624,940 A | 11/1986 | Wan et al. |
| 5,010,051 A | 4/1991 | Rudy |
| 5,116,800 A | 5/1992 | Williamson et al. |
| 5,384,300 A | 1/1995 | Feeley |
| 5,451,388 A | 9/1995 | Chen et al. |
| 5,531,972 A | 7/1996 | Rudy |
| 5,552,360 A | 9/1996 | Farrauto |
| 5,643,545 A | 7/1997 | Chen et al. |
| 5,653,949 A | 8/1997 | Chen et al. |
| 6,044,644 A | 4/2000 | Hu et al. |
| 6,080,375 A * | 6/2000 | Mussmann et al. ...... 423/213.5 |
| 6,254,842 B1 | 7/2001 | Hu et al. |
| 6,497,851 B1 | 12/2002 | Hu et al. |

FOREIGN PATENT DOCUMENTS

| | | |
|---|---|---|
| DE | 40 42 079 A1 | 7/1991 |
| DE | 4406648 C 1 | 3/1994 |
| DE | 19522913 A1 | 1/1996 |
| DE | 195 22 913 | 1/1996 |
| DE | 198 04 587 | 8/1998 |
| EP | 0 190 883 | 8/1986 |
| EP | 0 749 774 | 12/1996 |
| EP | 0 786 284 | 7/1997 |
| EP | 0 848 983 | 6/1998 |
| EP | 0796137 | 8/2003 |
| GB | 2290488 A | 1/1996 |
| JP | 62/068543 | 3/1987 |
| JP | 62/136245 | 6/1987 |
| JP | 4287820 | 10/1992 |

OTHER PUBLICATIONS

International Search Report dated Jan. 18, 2001 (PCT/ISA/210).
"Catalytic Materials for High-Temperature Combustion", Catal. Rev.–Sci. Eng. 35(3), 319 to 358 (1993).
SAE–Paper 930386 "Use of Light–Off Catalysts to Meet the California LEV/ULEV Standards".

* cited by examiner

Primary Examiner—Stanley S. Silverman
Assistant Examiner—Jonas N. Strickland
(74) Attorney, Agent, or Firm—Kalow & Springut LLP

(57) ABSTRACT

A starter catalyst for the purification of the exhaust gases from internal combustion engines, which include palladium on aluminum oxide and of barium oxide, as well as a process for its production. The barium oxide and palladium are together deposited in a finely divided state on the supporting material aluminum oxide and the average particle size of the palladium crystallites is between 3 and 7 nm. The small crystallite size of palladium and the barium oxide likewise deposited in finely divided state on the supporting material impart to the catalyst a high activity and long-term stability to high temperature stresses.

21 Claims, No Drawings

EXHAUST-GAS PURIFICATION CATALYST TO BE USED CLOSE TO THE ENGINE AND PROCESS FOR ITS PRODUCTION

INTRODUCTION AND BACKGROUND

This invention relates to an exhaust-gas purification catalyst to be used close to the engine, for the purification of the exhaust gases from internal combustion engines, which comprises palladium on aluminum oxide and of barium oxide, as well as a process for its production. The catalyst exhibits a high activity and long-term stability to high temperature stresses.

For about three decades, exhaust-gas purification catalysts have been used in order to convert the pollutants emitted by combustion engines, namely carbon monoxide (CO), hydrocarbons (HC) and oxides of nitrogen (NOx), into the environmentally acceptable compounds water, nitrogen and carbon dioxide. All three pollutants can be simultaneously removed from the exhaust gas of internal combustion engines by means of so-called three-way catalytic converters if the engine is operated using stoichiometric air/fuel mixtures.

The actual catalyst composition consists for the most part of an oxide support having a very large surface area, onto which the catalytically active components are deposited in a very finely divided state. The precious metals of the platinum group—platinum, palladium, rhodium, iridium, ruthenium and osmium—are particularly suitable as catalytically active components for the purification of stoichiometric exhaust gases. Suitable supports are, for example, aluminum oxide, silicon dioxide, titanium oxide, zirconium oxide and mixed oxides and zeolites thereof. The use of so-called active aluminum oxides having a specific surface (BET surface area, measured in accordance with DIN 66132) of more than 10 $m^2/g$ is preferred. To improve the dynamic conversion, three-way catalytic converters contain in addition so-called oxygen-storing components. These include cerium oxide, praseodymium oxide and cerium/zirconium mixed oxides.

The form in which the components of the catalyst are used during its production has an appreciable influence on the subsequent function of the catalyst. In this invention, the following cases are distinguished:
a) as "Finely Divided Solid Substances"
   By these are meant pulverulent materials having particle sizes of between 1 and about 50 $\mu$m. In the literature published in English, the terms "bulk material" or "particulate material" are used to describe these.
b) in the Form of Soluble "Precursor Compounds"
   The precursor compounds are usually deposited onto solid substances having large surface areas and, by means of heat treatment in an oxidizing or reducing atmosphere, are converted into the actual components which promote catalysis.

The catalyst composition is usually deposited in the form of a coating onto monolithic, inert honeycomb carriers made of ceramic or metal. The honeycomb carriers contain flow ducts for the gas being purified; these lie parallel to the longitudinal axis of the honeycomb carriers and are disposed over a narrow section of their cross-sectional area. The cell density (number of flow ducts per cross-sectional area of the honeycomb carriers) is generally between 10 and 200 $cm^{-2}$. At the present time honeycomb carriers having cell densities of 62 $cm^{-2}$ are still most frequently used. The catalytically active coating is deposited onto the wall surfaces of the partitions forming the boundary of the flow ducts in concentrations of 50 to 300 grams per liter (g/l) volume of the honeycomb carriers.

The known three-way catalytic converters are capable of adequately purifying the exhaust gases from internal combustion engines during normal operation. The residual emissions still remaining consist substantially of unburnt hydrocarbons, which are emitted mainly during the initial one to three minutes after the cold start. To decrease the cold-start emissions, so-called starter catalysts have been developed; these catalysts, unlike the normal three-way catalytic converters, are disposed not in the underbody region of the motor vehicle but close to the engine, in order to achieve as rapid a heating as possible of the starter catalysts to above their light-off temperature of 150 to 250° C. On the other hand, this arrangement impedes the starter catalysts during the normal operation of the motor vehicle, where exhaust-gas temperatures are up to 1000° C. and above. Starter catalysts, in the literature published in English also referred to as "close-coupled catalysts", should therefore have a very good temperature stability in addition to a low light-off temperature for the hydrocarbons. In this invention, catalysts which are used close to the engine are referred to as starter catalysts.

WO 97/23278 describes a starter catalyst which contains a metal of the platinum group on a support and has substantially no oxygen storing material. In a special embodiment of the starter catalyst, the latter contains palladium on aluminum oxide as well as an alkaline-earth metal to provide stability to thermal stresses. To deposit palladium onto the aluminum oxide, the aluminum oxide is impregnated with a solution of palladium nitrate. The palladium-containing aluminum oxide, together with a solution of zirconyl acetate and deionized water, is then ground. Solid barium oxide may also be added to the coating suspension.

An object of the present invention is to provide a starter catalyst comprising palladium, aluminum oxide and barium oxide and exhibiting an improved temperature stability compared with known starter catalysts.

SUMMARY OF THE INVENTION

Surprisingly, it has been found that this object can be achieved when barium oxide and palladium are present together on the supporting material aluminum oxide and the average particle size of the palladium crystallites is between 3 and 7 nm. This crystallite size of the palladium in combination with the closely neighbouring barium oxide ensures that the catalyst has a high activity, which even after ageing imparts to it even better performance data than those of the known starter catalysts.

The person skilled in the art knows that, within certain limits, the catalytic activity of a catalyst is the greater, the smaller the catalytically active metal crystallites, as the present investigations show. However, crystallite sizes for palladium of between 4 and 7 nm cannot be produced by conventional methods of impregnation, so that catalysts containing palladium with these average crystallite sizes have hitherto not been known. Only by application of the injection method described in DE 197 14 723 A1 was it possible to produce the required crystallite sizes. In order also to deposit barium oxide in close contact with palladium on the support, the method according to DE 197 14 723 A1 was adapted in a particularly advantageous way. The entire disclosure of DE 197 14 723 A1 is relied on and incorporated herein by reference.

The procedure for preparing the coating suspension is as follows: aluminum oxide and hydrated barium hydroxide are suspended in water, during which barium hydroxide passes into solution and shifts the pH value of the suspension into the basic range. Then an aqueous solution of an acidic precursor of palladium, preferably palladium nitrate, is introduced into the suspension by means of capillary injection, with constant stirring; that is, palladium nitrate is injected by means of capillaries whose openings end beneath the surface of the suspension. At the same time, the suspension is stirred intensively in order to ensure that the palladium nitrate is distributed in the suspension homogeneously and as rapidly as possible. On conclusion of the addition of palladium nitrate, stirring of the suspension is continued for some time in order to facilitate the fixing of palladium and barium in intimate contact with one another on the surface of the aluminum oxide. The pH value of the suspension is shifted into the neutral range as a result of adding the acidic palladium nitrate solution.

The resulting suspension can be used directly for the coating of honeycomb carriers by means of known processes. The solids content of the suspension is adjusted to a value preferably of between 25 and 60 wt. %. This value enables the coating concentrations of 20 to 200 g/l intended for the starter catalyst to be applied to the honeycomb carriers in only one coating operation. If necessary, the viscosity of the suspension can be suitably accommodated to the coating process employed by additions of bases or lyes.

After being coated, the honeycomb carriers are dried at elevated temperature and subsequently calcined in air at temperatures of between 300 and 700° C. for a period of 0.5 to 5 hours. The precursor compounds of palladium and barium are decomposed and oxidized as a result of the calcination. It is known that barium oxide reacts in air with the carbon dioxide present in the air to form barium carbonate, so that the barium oxide particles also contain barium carbonate, at least at the surface. Despite this fact, for the sake of simplicity only barium oxide is discussed in this invention.

According to DE 197 14 723 A1, to chemically fix the palladium to the aluminum oxide, a dilute ammonia solution is injected into the suspension in a similar manner to palladium nitrate. The use of barium hydroxide for the chemical fixing of the palladium to the aluminum oxide in the present invention has the advantage that one can dispense with the use of ammonia as basic material. The basic properties of the barium hydroxide cause the barium required for the catalyst to be deposited in intimate mixture with palladium onto the aluminum oxide. During the concluding calcination, palladium and barium are converted into their final form. The barium oxide forming on the surface of the aluminum oxide assists the stabilization of the aluminum oxide to thermal stresses.

So-called active aluminum oxides are used as supports for barium oxide and palladium. These are finely divided aluminum oxides which exhibit the crystal structures of the transition phases of aluminum oxide. They include chi-, delta-, gamma-, kappa-, theta- and eta-aluminum oxide. The active aluminum oxides have specific surfaces of up to 400 $m^2/g$. With increasing temperature, the above-mentioned crystal structures become interconverted, with simultaneous decrease of the specific surface (see Ullmann's Encyclopedia of Industrial Chemistry; $5^{th}$ Edition 1985; Vol A1; pages 557–563). Above 1150° C. only alpha-aluminum oxide, which has a low surface area, is stable. This process can be retarded by stabilization with alkaline-earth metal oxides, in particular barium oxide, rare-earth oxides, preferably lanthanum oxide, or silicon dioxide. For this, the stabilized, active aluminum oxides usually contain 1 to 10 wt. % of barium oxide, lanthanum oxide or silicon dioxide, based on the total weight of the stabilized material.

For the present invention, it is preferable to use a gamma-aluminum oxide having a specific surface of between 100 and 180 $m^2/g$ and stabilized with 2 to 4 wt. % lanthanum oxide. The aluminum oxide is further stabilized by the barium hydroxide used in the deposition of the palladium.

The starter catalyst according to the invention contains preferably 1 to 10 g/l palladium, 45 to 180 g/l aluminum oxide, optionally stabilized with lanthanum oxide, and 5 to 20 g/l barium oxide.

DETAILED DESCRIPTION OF THE INVENTION

The starter catalyst is disposed close to the engine and is used in combination with a main catalyst located in the underfloor region of the motor vehicle. Here it acts as a pure oxidizing catalyst for the hydrocarbons emitted during the cold-start stage. If, for reasons of cost, the main catalyst is to be dispensed with, the starter catalyst must then be equipped with an additional three-way function. For this, in a special embodiment of the invention, a second catalytically active coating containing platinum and rhodium on aluminum oxide as well as an oxygen-storing component and additional aluminum oxide is applied to the first coating of the starter catalyst. The second layer is applied to the honeycomb carriers in a concentration of 30 to 100 g/l.

The coating suspension for this second layer is prepared as follows:- firstly, the aluminum oxide serving as a support for platinum and rhodium is coated with these two metals of the platinum group by impregnation with an aqueous solution of soluble precursor compounds of these metals, dried and calcined. The catalysed support, together with an oxygen-storing component and additional active aluminum oxide, is then suspended in water in order to prepare a coating suspension. The support already provided with the first catalytic coating is coated anew with this coating suspension. Finally the coated support is dried and calcined.

All compounds which are soluble in the chosen solvent and can be decomposed to platinum by heating are suitable as precursor compounds for platinum. Examples of such compounds are hexachloroplatinic acid, ammonium chloroplatinate, platinum tetrachloride, platinum nitrate, tetraarnmineplatinum nitrate and tetraammineplatinum hydroxide. It is preferable to use those platinum precursor compounds which are known to aid the formation of platinum coatings wherein the platinum crystallites are highly dispersed. These compounds include anionic coordination compounds such as methylethanolamineplatinum(IV) hexahydroxide $((MEA)_2Pt(OH)_6=((OH-C_2H_4-NH_2-CH_3)_2{}^+Pt^{IV}(OH)_6)$ and ethanolamineplatinum(IV) hexahydroxide $((EA)_2Pt(OH)_6=(OH-C_2H_4-NH_3)_2{}^+Pt^{IV}(OH)_6)$.

Suitable precursor compounds for rhodium are, for example, rhodium chloride, rhodium acetate and rhodium nitrate.

The aluminum oxide serving as a support for platinum and rhodium can be impregnated with their precursor compounds sequentially in any order, or simultaneously by using a combined solution. Preferably, however, the aluminum oxide is covered first with platinum and then with rhodium, applying the method of capillary injection already described. To this end, a solution of ethanolamineplatinum(IV) hexahydroxide is used. The aluminum oxide intended as supporting material is suspended, for example, in water and the platinum solution is subsequently injected. The deposition of platinum onto aluminum oxide is initiated by suitably adjusting the pH value of the suspension. After deposition of the platinum, rhodium is deposited onto the aluminum oxide. This is effected by adding a solution of an acidic precursor compound of rhodium, for example, rhodium nitrate, to the suspension. Finally, platinum and rhodium are fixed to the support by adjusting the pH value of the suspension.

The suspension thus obtained can be processed immediately to obtain the final coating suspension. For this, the oxygen-storing material and optionally additional aluminum oxide are added to the suspension. The second layer can then be deposited on the support, using this suspension.

The oxygen-storing material used is preferably a cerium/zirconium mixed oxide stabilized with praseodymium oxide. If no prepared stabilized material is available, the cerium/zirconium mixed oxide can also be stabilized in situ. To this end, a solution of a praseodymium oxide precursor compound, cerium/zirconium mixed oxide and optionally further aluminum oxide are stirred into the suspension, which contains the aluminum oxide already catalyzed with platinum and rhodium. This suspension is then used for the application of the second coating to the supporting material of the catalyst. During the calcination of the coating, the precursor compound of the praseodymium oxide is decomposed and converted into praseodymium oxide. Here the praseodymium oxide is deposited in highly dispersed form on all the finely divided components of the second coating and in this way the cerium/zirconium mixed oxide used is rendered stable to thermal stresses.

The invention will now be explained in more detail by means of the following Examples and Comparison Examples. Catalysts according to the invention were prepared and characterised with regard to their catalytic properties. In all cases the supports used for the catalysts were ceramic honeycomb carriers made of cordierite having a cell density of 62 cm$^{-2}$ (400 cpsi), a diameter of 2.54 and a length of 7.62 cm.

COMPARISON EXAMPLE 1

γ-Aluminum oxide stabilized with lanthanum oxide (3 wt. % lanthanum oxide; specific surface 140 g/m$^2$) was impregnated by pore volume impregnation using an aqueous solution of palladium nitrate. To this end, the pulverulent aluminum oxide was circulated in a tank and sprayed with the impregnating solution. The volume of the impregnating solution corresponded to 90% of the water absorption capacity of the powder used. The concentration of the impregnating solution was so chosen that the palladium contained in it corresponded to 2.5 wt. % palladium, based on the total weight of aluminum oxide and palladium. After the impregnation the material was dried and then calcined in air at 500° C. for a period of 2 hours.

EXAMPLE 1

A second powdered charge of the stabilized γ-aluminum oxide was covered with palladium by the process according to the invention.

To this end, aluminum oxide and barium hydroxide were suspended in water, during which barium hydroxide passed into solution and shifted the pH value of the suspension into the basic range. Then an aqueous solution of palladium nitrate was introduced into the suspension by means of capillary injection, with constant stirring. On conclusion of the addition of palladium nitrate, the suspension was stirred for a period of one hour in order to facilitate the fixing of palladium and barium in intimate contact with one another on the surface of the aluminum oxide. After having been separated from the aqueous phase of the suspension, the catalyzed aluminum oxide was dried and then calcined in air as described in Comparison Example 1.

The particle-size distributions of the palladium crystallites deposited onto the aluminum oxide were determined for both of the catalyst powders of Comparison Example 1 and Example 1 by analysis of micrographs taken with a transmission electron microscope. The results of these analyses are shown in Table 1.

TABLE 1

| Size distribution of the palladium crystallites on aluminum oxide | | | |
|---|---|---|---|
| Comparison Example 1 | | Example 1 | |
| Particle size [nm] | Size distribution [%] | Particle size [nm] | Size distribution [%] |
| 6 | 7.7 | 4.1 | 2.9 |
| 8 | 7.7 | 4.4 | 8.6 |
| 10 | 13.0 | 4.7 | 14.3 |
| 12 | 17.0 | 5.0 | 22.9 |
| 14 | 26.9 | 5.3 | 31.4 |
| 16 | 16.0 | 5.6 | 17.1 |
| 18 | 7.7 | 5.9 | 2.9 |
| 20 | 3.8 | | |

These investigations show that the conventional impregnation method results in a very broad size distribution with an average particle size of 13 nm and a breadth of ±5.5 nm. In comparison, the preparation of the catalyst powder according to the invention as in Example 1 produces a very narrow size distribution with an average particle size of only 5 nm and a breadth of ±0.5 nm.

COMPARISON EXAMPLE 2

A number of honeycomb carriers were coated with the catalyst material prepared in Comparison Example 1, by first of all suspending the material in water and then applying it to the walls of the flow ducts of the honeycomb carriers by dipping the latter into this suspension. The coating concentration was 140 grams per litre of honeycombed structure (g/l). The coating was dried and then calcined in air at 500° C. for a period of 2 hours. The concentration of palladium, based on the catalyst body, was thus 3.53 g/l (corresponding to 100 g/ft$^3$). These catalysts are referred to below as CE 1.

EXAMPLE 2

The catalyst material according to the invention from Example 1 was applied to a number of honeycomb carriers as described in Comparison Example 2. The total coating concentration was 140 g/l, of which 10 g/l was barium oxide and 3.53 g/l was palladium. These catalysts are referred to below as E1.

EXAMPLE 3

A number of catalysts from Example 2 were provided with a second coating as detailed in Table 2. These catalysts are referred to below as E2.

To prepare the second coating, first of all stabilized aluminum oxide (3 wt. % La$_2$O$_3$, 97 wt. % Al$_2$O$_3$) was suspended in water. Then a solution of a chlorine-free platinum salt ((EA)$_2$Pt(OH)$_6$) was injected into the suspension and was rapidly adsorbed onto the aluminum oxide. A solution of rhodium nitrate was then injected into the suspension. The two precious-metal components were fixed onto the aluminum oxide by raising the pH value of the suspension. Finally, unstabilized γ-aluminum oxide, praseodymium acetate and a cerium/zirconium mixed oxide (70 wt. % cerium oxide, 30 wt. % zirconium oxide) were added to the suspension.

Prior to the coating of the honeycomb carriers, the pH of the suspension was adjusted to a value of 6. The suspension was then homogenized in a mill, so that its oxide components had an average particle size of 2 to 3 µm.

The honeycomb carriers were provided with a second coating by being dipped in this suspension. The coating was dried and then calcined in air at 500° C. The composition of this second coating is listed in Table 2.

TABLE 2

Composition of the second layer of the catalysts E 2 from Example 3

| Component | Concentration [g/l] |
|---|---|
| γ-Aluminum oxide (stabilized with 3 wt. % $La_2O_3$) | 10 |
| $CeO_2/ZrO_2$ (70 wt. % $CeO_2$; 30 wt. % $ZrO_2$) | 18.5 |
| $Pr_6O_{11}$ | 1.5 |
| γ-Aluminum oxide (unstabilized) | 40 |
| Total oxide content | 79 |
| Platinum | 0.235 |
| Rhodium | 0.235 |
| Total content of platinum plus rhodium | 0.47 |

Catalytic Activity of the Catalysts CE1 and E1

The catalytic properties of the catalysts were investigated both on exposure to a synthetic exhaust gas and close to the engine. Prior to the measurements in the synthetic exhaust gas, the catalysts were subjected to an ageing process in air at 1100° C. for a period of 24 hours.

The investigations in the synthetic exhaust gas were carried out in a so-called model gas plant. The synthetic exhaust gas had the composition given in Table 3.

To determine the light-off temperatures of the catalysts CE1 and E1, these were exposed to the synthetic gas at a space velocity of 100,000 $h^{-1}$, the temperature of the exhaust gas being raised from 75 to 500° C. at a rate of 20° C./min. The light-off temperatures for the three pollutants carbon monoxide CO, hydrocarbons HC and oxides of nitrogen NOx were determined at a conversion of the respective pollutants of 70% ($T_{70\%}$).

The measurements were carried out at two different lambda values (λ=0.993 and λ=1.15). The lambda value is the air/fuel ratio standardized to stoichiometric conditions and for this reason is often also referred to as the standardized air/fuel ratio. The lambda value of the exhaust gas was adjusted to the requirements for the respective measurements by varying the CO content. The measurements at λ=0.993 were carried out dynamically; that is, the lambda value was modulated at 1 Hz and an amplitude of ±0.87 A/F (A/F=air/fuel). At λ=1.15 there was no modulation. The results of these measurements are listed in Table 4.

TABLE 3

Composition of the model exhaust gas

| Gas component | Concentration | Gas component | Concentration |
|---|---|---|---|
| CO | 1.4 Vol.-% | NOx (NO) | 0.1 Vol.-% |
| $H_2$ | 0.47 Vol.-% | $CO_2$ | 14 Vol.-% |
| $O_2$ | 1.2 Vol.-% | $SO_2$ | 20 Vol.-ppm |

TABLE 3-continued

Composition of the model exhaust gas

| Gas component | Concentration | Gas component | Concentration |
|---|---|---|---|
| Propene | 666 Vol.-ppm | $H_2O$ | 10 Vol.-% |
| Propane | 333 Vol.-ppm | $N_2$ | Remainder |

TABLE 4

Light-off temperatures $T_{70\%}$ of the catalysts CE1 and E1 at a space velocity of 100,000 $h^{-1}$ for a model gas

| | λ = 0.993; ±0.87 A/F at 1 Hz | | | λ = 1.15; static | |
|---|---|---|---|---|---|
| Catalyst | CO [° C.] | HC [° C.] | NOx [° C.] | CO [° C.] | HC [° C.] |
| CE1 | 288 | 293 | 315 | 252 | 273 |
| E1 | 275 | 282 | 285 | 245 | 266 |

The pollutant conversions determined with these measurements, at an exhaust gas temperature of 400° C. at λ=0.993 in dynamic operation, are presented in Table 5.

TABLE 5

Dynamic pollutant conversion of the catalysts CE1 and E1 for the model exhaust gas at an exhaust gas temperature of 400° C.

| | λ = 0993; ± 0.87 A/F at 1 Hz | | |
|---|---|---|---|
| Catalyst | CO [%] | HC [%] | NOx [%] |
| CE1 | 63 | 82 | 61 |
| E1 | 61 | 86 | 67 |

Two further samples of the catalysts CE1 and E1 were subjected to an ageing process close to an engine (displacement 2.8l) for a period of 50 hours at an exhaust gas temperature of 870° C. in front of the catalysts and with periodic fuel cut-off. Then the light-off temperatures close to the engine determined for 50% conversion in rich exhaust gas at λ=0.999 under dynamic conditions (lambda modulation: ±0.5 A/F at 1 Hz) and in lean exhaust gas at λ=1.15 under static conditions. The temperature of the engine exhaust gas was raised from 75° C. to 500° C. at a rate of 38° C./min by means of a heat exchanger. The results are shown in Table 6.

TABLE 6

Light-off temperatures $T_{50\%}$ of the catalysts CE1 and E1 at a space velocity of 65,000 $h^{-1}$; measurements using an engine exhaust gas

| | λ = 0.999; ±0.5 A/F at 1 Hz | | | λ = 1.15; static | |
|---|---|---|---|---|---|
| Catalyst | CO [° C.] | HC [° C.] | NOx [° C.] | CO [° C.] | HC [° C.] |
| CE1 | 453 | 448 | 450 | 241 | 249 |
| E1 | 432 | 420 | 442 | 244 | 243 |

The above measurements show that the catalyst according to the invention has lower light-off temperatures both in the model exhaust gas and close to the engine.

Determination of the Crossover-point of the CO/NOx Conversion Curves

If the lambda value of the exhaust gas is altered continuously from rich (λ<1) to lean (λ>1), then initially in the rich region the conversion of CO is very low, whereas the conversion of NOx is maximal. With increasing lambda value, the conversion of CO increases, while the conversion of NOx decreases. At a lean exhaust gas composition the conversion of NOx is then low, whereas the conversion of CO attains its maximum value. At an average lambda value, the two conversion curves intersect one another. The point of intersection of the two conversion curves (CO/NOx crossover-point) consequently gives the maximum conversion which can be attained simultaneously for CO and NOx.

Prior to the measurements, two fresh catalysts CE1 and E1 were subjected to an ageing process close to an engine (displacement 2.8l) for a period of 50 hours at an exhaust gas temperature of 870° C. in front of the catalysts and with periodic fuel cut-off. To determine the crossover-points of the CO and NOx conversion curves, the lambda value of the engine exhaust gas was varied periodically back and forth between the values of 0.98 and 1.02. In this process, the change from one lambda value to another was effected within about 3 minutes. A lambda value modulation at 1 Hz was superimposed on this slow alteration of the lambda value.

Table 7 shows the results of the measurements for the catalysts CE1 and E1 at exhaust gas temperatures of 400 and 450° C. as well as two different degrees of modulation of the lambda value.

TABLE 7

Dynamic CO/NOx crossover-conversion of the catalysts CE1 and E1.

| Catalyst | ± 0.5 A/F; 1 Hz; 400° C. Conversion [%] | ± 1.0 A/F; 1Hz; 450° C. Conversion [%] |
|---|---|---|
| CE1 | 62 | 55 |
| E1 | 70 | 61 |

Further variations and modifications of the foregoing will be apparent to those skilled in the art and are intended to be encompassed by the claims appended hereto.

European patent application EP 00 117 618.9 is relied on and incorporated herein by reference.

What is claimed is:

1. An exhaust-gas purification catalyst to be used close to the engine, for the purification of the exhaust gases from an internal combustion engine, comprising:
   palladium on aluminum oxide and barium oxide, wherein barium oxide and palladium crystallites are together deposited on the aluminum oxide support and the average particle size of the palladium crystallites present on the support is between 3 and 7 nm, wherein the palladium crystallites are deposited by capillary injection.

2. An exhaust gas purification catalyst comprising a monolithic honeycomb carrier made of ceramic or metal, having deposited thereon as a first catalytically active coating the catalyst of claim 1.

3. The catalyst according to claim 2, further comprising, a second catalytically active coating on said honeycomb carrier containing platinum and rhodium on aluminum oxide as well as an oxygen-storing component and additional aluminum oxide applied to the first catalytically active coating.

4. The catalyst according to claim 3, wherein the aluminium oxide serving as a support for platinum and rhodium is stabilized with lanthanum oxide.

5. A process for producing the catalyst according to claim 3 comprising forming a first coating by suspending aluminium oxide and barium hydroxide in water, passing the barium hydroxide into solution to form a suspension shifting the pH value of the suspension into a basis range, introducing an aqueous solution of a precursor of palladium into suspension by capillary injection, with the constant stirring, and coating the honeycomb carrier with the resulting suspension, and drying, and thereafter depositing a second catalytially active coating containing platinum and rhodium or aluminium oxide, an oxygen storage component and additional aluminium oxide to the first coating, drying and calcining.

6. A process for producing the catalyst according to claim 2, comprising suspending aluminium oxide and barium hydroxide in water, passing the barium hydroxide into solution, to form a suspension shifting the pH value of the suspension into a basic range, introducing an aqueous solution of a precursor of palladium into the suspension by capillary injection, with constant stirring, and coating the honeycomb carrier with the resulting suspension, drying and calcining.

7. The process according to claim 6 which is carried out in the absence of ammonia.

8. The process according to claim 6 further comprising adjusting solids content of said suspension to 25 to 60 wt. % of said suspension.

9. The process according to claim 6 wherein the aluminum oxide is stabilized with lanthanum oxide.

10. A process for the purification of the exhaust gases of a motor vehicle powered by an internal combustion engine, wherein a starter catalyst is disposed in a position close to the engine comprising passing said exhaust gases in contact with the catalyst according to claim 2 and thereafter contacting said exhaust gases with another catalyst.

11. An exhaust-gas purification catalyst comprising a monolithic honeycomb carrier made of ceramic or metal, having deposited thereon as a first catalytically active coating in a concentration of between 50 and 200 grams per liter volume of the honeycomb carrier, the catalyst of claim 1.

12. The catalyst according to claim 11 wherein said catalyst contains 1 to 10 g/l palladium, 45 to 180 g/l aluminum oxide and 5 to 20 g/l barium oxide.

13. The catalyst according to claim 11, further comprising, a second catalytically active coating on said honeycomb carrier containing platinum and rhodium on aluminum oxide as well as an oxygen-storing component and additional aluminum oxide applied to the first catalytically active coating.

14. The catalyst according to claim 13, wherein the aluminium oxide serving as a support for platinum and rhodium is stabilized with lanthanum oxide.

15. The catalyst according to claim 14, wherein the second layer is in a concentration of 30 to 100 g/l volume of the honeycomb carrier.

16. The catalyst according to claim 13, wherein the second layer is in a concentration of 30 to 100 g/l volume of the honeycomb carrier.

17. A process for producing the catalyst according to claim 13 comprising forming a first coating by suspending aluminium oxide and barium hydroxide in water, passing the barium hydroxide into solution to form a suspension shifting the pH value of the suspension into a basis range, introducing an aqueous solution of a precursor of palladium into suspension by capillary injection, with the constant stirring, and coating the honeycomb carrier with the resulting suspension, and drying, and thereafter depositing a second catalytially active coating containing platinum and rhodium or aluminium oxide, an oxygen storage component and additional aluminium oxide to the first coating, drying and calcining.

18. A process for producing the catalyst according to claim 11, comprising suspending aluminium oxide and barium hydroxide in water, passing the barium hydroxide into solution, to form a suspension shifting the pH value of the suspension into a basic range, introducing an aqueous solution of a precursor of palladium into the suspension by means of capillary injection, with constant stirring, and coating the honeycomb carrier with the resulting suspension, drying and calcining.

19. A process for the purification of the exhaust gases of a motor vehicle powered by an internal combustion engine, wherein a starter catalyst is disposed in a position close to the engine comprising passing said exhaust gases in contact with the catalyst according to claim 11 and thereafter contacting said exhaust gases with another catalyst.

20. The catalyst according to claim 1 which has a size distribution of ±0.5 nm.

21. A starter catalyst for the purification of the exhaust gases from an internal combustion engine, comprising palladium and barium oxide on aluminum oxide, which catalyst is applied in the form of a coating to an inert honeycomb carrier, produced by a process comprising suspending aluminium oxide and barium hydroxide in water to form a suspension, whereby barium hydroxide passes into solution and shifts the pH value of the suspension into the basic range, introducing an aqueous solution of a precursor of palladium into the suspension by means of capillary injection, with constant stirring, and coating a honeycomb carrier with the resulting suspension, thereafter drying and calcining.

* * * * *